US012713434B2

(12) United States Patent
Sartori et al.

(10) Patent No.: US 12,713,434 B2
(45) Date of Patent: Aug. 18, 2026

(54) METHODS AND APPARATUS FOR DISABLING OF OPTION 1 HYBRID AUTOMATIC REPEAT REQUEST (HARQ) FEEDBACK FOR SIDELINK COMMUNICATION

(71) Applicant: Huawei Technologies Co., Ltd., Shenzhen (CN)

(72) Inventors: Philippe Sartori, Naperville, IL (US); Brian Classon, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 780 days.

(21) Appl. No.: 17/895,542

(22) Filed: Aug. 25, 2022

(65) Prior Publication Data

US 2022/0408477 A1 Dec. 22, 2022

Related U.S. Application Data

(63) Continuation of application No. PCT/US2020/055276, filed on Oct. 12, 2020.

(60) Provisional application No. 62/983,086, filed on Feb. 28, 2020.

(51) Int. Cl.

| | |
|---|---|
| ***H04W 72/23*** | (2023.01) |
| ***H04L 1/1812*** | (2023.01) |
| ***H04W 72/20*** | (2023.01) |
| ***H04W 72/566*** | (2023.01) |

(52) U.S. Cl.

CPC ........... *H04W 72/23* (2023.01); *H04L 1/1812* (2013.01); *H04W 72/20* (2023.01); *H04W 72/569* (2023.01)

(58) Field of Classification Search

CPC ... H04W 72/23; H04W 72/20; H04W 72/569; H04L 1/1812; H04L 1/1864; H04L 1/1896; H04L 2001/0092; H04L 1/1854

See application file for complete search history.

(56) References Cited

U.S. PATENT DOCUMENTS

2019/0288820 A1* 9/2019 Lyu .......................... H04L 1/16

FOREIGN PATENT DOCUMENTS

CN 111865485 * 4/2019

OTHER PUBLICATIONS

LG Electronics, “Feature lead summary #3 for AI 7.2.4.5 Physcial layer procedures for sidelink,” 3GPP TSG RAN WG1 #99, R1-1913572, Nov. 18-22, 2019 (Year: 2019).*

LG Electronics, “Feature lead summary #3 for AI 7.2.4.5 Physcial layer procedures for sidelink,” 3GPP TSG RAN WG1 #99, R1-1913572, Agenda Item 7.2.4.5, Reno, Nevada, Nov. 18-22, 2019, 44 pages.

CATT, “Remaining issues on physical layer procedures for NR V2X,” 3GPP TSG RAN WG1 Meeting #100, R1-2000524, Agenda Item 7.2.4.5, Feb. 24-Mar. 6, 2020, 5 pages.

* cited by examiner

*Primary Examiner* — Sujoy K Kundu
*Assistant Examiner* — Raul Rivas
(74) *Attorney, Agent, or Firm* — Slater Matsil, LLP

(57) ABSTRACT

A method includes receiving a first indicator indicating distance based HARQ feedback operation with negative acknowledgement only and a first sidelink message grant; and determining that location information associated with a first communication device is unavailable, and based thereon, transmitting a second indicator indicating that location information is unavailable.

18 Claims, 7 Drawing Sheets

METHODS AND APPARATUS FOR DISABLING OF OPTION 1 HYBRID AUTOMATIC REPEAT REQUEST (HARQ) FEEDBACK FOR SIDELINK COMMUNICATION

CROSS-REFERENCE TO RELATED APPLICATIONS

This application is a continuation of International Patent Application No. PCT/US2020/055276, filed on Oct. 12, 2020, entitled "Methods and Apparatus for Disabling of Option 1 Hybrid Automatic Repeat Request (HARQ) Feedback for Sidelink Communication," which claims the benefit of U.S. Provisional Application No. 62/983,086, filed on Feb. 28, 2020, entitled "Methods and Apparatus for Automatic Disabling of Option 1 HARQ Feedback for Sidelink Communication," applications of which are hereby incorporated herein by reference in their entireties.

TECHNICAL FIELD

The present disclosure relates generally to methods and apparatus for digital communications, and, in particular embodiments, to methods and apparatus for disabling of option 1 hybrid automatic repeat request (HARQ) feedback for sidelink communication.

BACKGROUND

It is expected that vehicle-to-everything (V2X) communications will play an essential role in the evolution of the automotive industry in the near future and revolutionize the field. Dedicated short-range communication (DSRC) by IEEE and the long-term evolution-vehicular (LTE-V) developed by 3GPP are two major vehicular communication technologies developed thus far.

The third generation partnership project (3GPP) has also approved a work item ("Revised WID on 5G V2X with NR sidelink," LGE, RAN #85, Newport Beach, USA, Sep. 16-20, 2019, which is hereby incorporated herein by reference in its entirety) for the standardization of the fifth generation (5G) new radio access technology (NR) vehicle-to-everything (V2X) wireless communication with the goal of providing 5G-compatible high-speed reliable connectivity for vehicular communications in the near future for applications such as safety systems and autonomous driving. High data rates, low latencies and high reliabilities are some of the key areas that are being investigated and standardized.

V2X communications constitute communications on the sidelink (SL) between devices such as user equipment (UEs), road side units (RSUs), pedestrians (P), in addition to downlink (DL) (base station to UE) and uplink (UL) (UE to base station). For V2X communication, groupcast is supported. One groupcast option is to have groups formed based on geographical distance.

In some cases, one UE can lose its location information. It thus cannot perform group operations based on distance. In such a case, the UE needs to interrupt distance-based operation. Thus, there is a need for a method to disable distance-based operation.

SUMMARY

According to a first aspect, a method implemented by a first communication device is provided. The method comprising: receiving, by the first communication device, a first indicator indicating distance based HARQ feedback operation with negative acknowledgement only and a first sidelink message grant; and determining, by the first communication device, that location information associated with the first communication device is unavailable, and based thereon, transmitting, by the first communication device, a second indicator indicating that the location information is unavailable.

In a first implementation form of the method according to the first aspect, the first indicator being received in a sidelink control information (SCI) message.

In a second implementation form of the method according to the first aspect or any preceding implementation form of the first aspect, the first communication device comprising a sidelink user equipment (UE).

In a third implementation form of the method according to the first aspect or any preceding implementation form of the first aspect, the second indicator being transmitted in a physical sidelink control channel (PSCCH).

In a fourth implementation form of the method according to the first aspect or any preceding implementation form of the first aspect, the second indicator being transmitted in a combination of a physical sidelink feedback channel (PSFCH) and a radio resource control (RRC) message.

In a fifth implementation form of the method according to the first aspect or any preceding implementation form of the first aspect, the first indicator being received from a second communication device.

In a sixth implementation form of the method according to the first aspect or any preceding implementation form of the first aspect, the location information comprising a location of the first communication device.

In a seventh implementation form of the method according to the first aspect or any preceding implementation form of the first aspect, the second indicator being transmitted to a second communication device.

In an eighth implementation form of the method according to the first aspect or any preceding implementation form of the first aspect, further comprising: receiving, by the first communication device from a third communication device, a third indicator indicating a second sidelink message grant; determining, by the first communication device, that the location information is available, and based thereon: evaluating, by the first communication device, a distance between the first communication device and the third communication device; and determining, by the first communication device, that a sidelink message associated with the second sidelink message grant was unsuccessfully received and the distance meets a distance threshold, and based thereon, transmitting, by the first communication device to the third communication device, a negative acknowledgement (NACK).

According to a second aspect, a method implemented by a first communication device is provided. The method comprising: receiving, by the first communication device, a first indicator indicating distance based HARQ feedback operation with negative acknowledgement only and a first sidelink message grant; and determining, by the first communication device, that location information is unavailable and a first sidelink message associated with the first sidelink message grant was unsuccessfully received, and based thereon: determining, by the first communication device, a priority of the first sidelink message associated with the first sidelink message grant meets a priority threshold, and based thereon, transmitting a NACK.

In a first implementation form of the method according to the second aspect, further comprising: receiving, by the first communication device, a second indicator indicating a second sidelink message grant; and determining, by the first communication device, that the location information is unavailable and a second sidelink message associated with the second sidelink message grant was unsuccessfully received, and based thereon: determining, by the first communication device, a priority of the second sidelink message associated with the second sidelink message grant fails to meet the priority threshold, and based thereon, stopping, by the first communication device, a transmission of the NACK.

In a second implementation form of the method according to the second aspect or any preceding implementation form of the second aspect, the first indicator being received in a SCI message.

In a third implementation form of the method according to the second aspect or any preceding implementation form of the second aspect, the first indicator being received from a second communication device.

According to a third aspect, a first communication device is provided. The first communication device comprising: one or more processors; and a non-transitory memory storage comprising instructions that, when executed by the one or more processors, cause the first communication device to: receive a first indicator indicating distance based HARQ feedback operation with negative acknowledgement only and a first sidelink message grant; and determine that location information associated with the first communication device is unavailable, and based thereon, transmitting, by the first communication device, a second indicator indicating that the location information is unavailable.

In a first implementation form of the first communication device according to the third aspect, the first indicator being received in a SCI message.

In a second implementation form of the first communication device according to the third aspect or any preceding implementation form of the third aspect, the first communication device comprising a sidelink UE.

In a third implementation form of the first communication device according to the third aspect or any preceding implementation form of the third aspect, the second indicator being transmitted in a PSCCH.

In a fourth implementation form of the first communication device according to the third aspect or any preceding implementation form of the third aspect, the second indicator being transmitted in a combination of a PSFCH and a RRC message.

In a fifth implementation form of the first communication device according to the third aspect or any preceding implementation form of the third aspect, the first indicator being received from a second communication device.

In a sixth implementation form of the first communication device according to the third aspect or any preceding implementation form of the third aspect, the location information comprising a location of the first communication device.

In a seventh implementation form of the first communication device according to the third aspect or any preceding implementation form of the third aspect, the second indicator being transmitted to a second communication device.

In an eighth implementation form of the first communication device according to the third aspect or any preceding implementation form of the third aspect, the instructions further causing the first communication device to: receive, from a third communication device, a third indicator indicating a second sidelink message grant; determine that the location information is available, and based thereon: evaluate a distance between the first communication device and the third communication device; and determine that a sidelink message associated with the second sidelink message grant was unsuccessfully received and the distance meets a distance threshold, and based thereon, transmit, to the third communication device, a NACK.

According to a fourth aspect, a first communication device is provided. The first communication device comprising: one or more processors; and a non-transitory memory storage comprising instructions that, when executed by the one or more processors, cause the first communication device to: receive a first indicator indicating distance based HARQ feedback operation with negative acknowledgement only and a first sidelink message grant; and determine that location information is unavailable and a first sidelink message associated with the first sidelink message grant was unsuccessfully received, and based thereon: determine a priority of the first sidelink message associated with the first sidelink message grant meets a priority threshold, and based thereon, transmitting a NACK.

In a first implementation form of the first communication device according to the fourth aspect, the instructions further causing the first communication device to: receive a second indicator indicating a second sidelink message grant; and determine that the location information is unavailable and a second sidelink message associated with the second sidelink message grant was unsuccessfully received, and based thereon: determine a priority of the second sidelink message associated with the second sidelink message grant fails to meet the priority threshold, and based thereon, stop a transmission of the NACK.

In a second implementation form of the first communication device according to the fourth aspect or any preceding implementation form of the fourth aspect, the first indicator being received in a SCI message.

In a third implementation form of the first communication device according to the fourth aspect or any preceding implementation form of the fourth aspect, the first indicator being received from a second communication device.

An advantage of a preferred embodiment is that it is possible to disable participation in distance based groupcast option 1 operation when the UE does not have its location information. Disabling UE participation helps to prevent incorrect operation when the UE does not send positive feedback, which would lead to the UE being interpreted as being too far away or that the transmission was received correctly. Neither of which are correct. Sending negative feedback is also incorrect behavior and may lead to unnecessary retransmissions.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
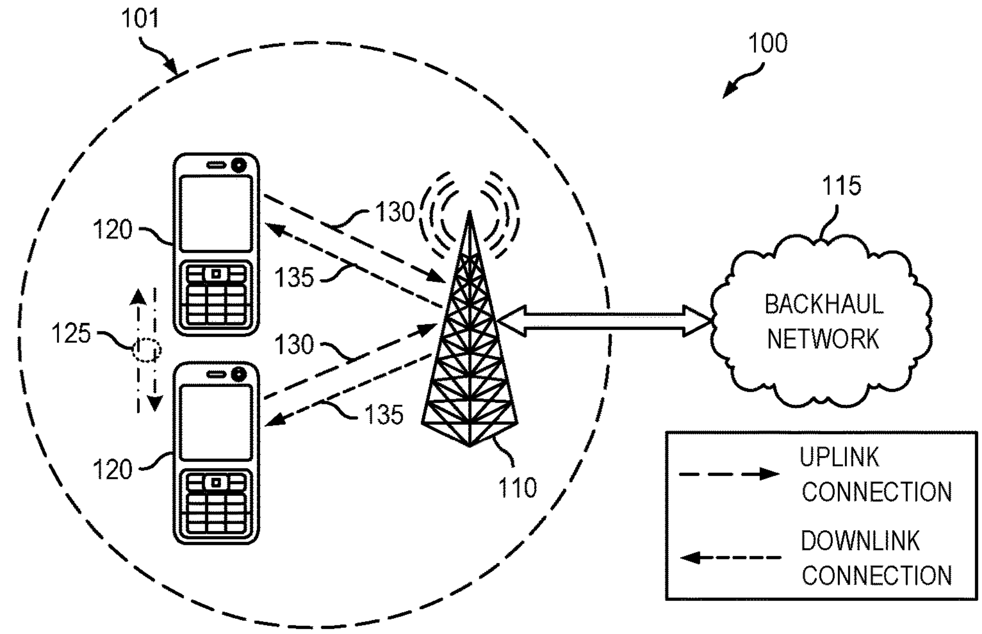
FIG. 1 illustrates an example communications system.

FIG. 1 illustrates an example communications system 100. Communications system 100 includes an access node 110, with coverage area 101, serving user equipments (UEs), such as UEs 120. Access node no is connected to a backhaul network 115 that provides connectivity to services and the Internet. In a first operating mode, communications to and from a UE passes through access node no. In a second operating mode, communications to and from a UE do not pass through access node no, however, access node no typically allocates resources used by the UE to communicate when specific conditions are met. Communication between a UE pair in the second operating mode occurs over sidelinks 125, comprising uni-directional communication links. Communication between a UE and access node pair also occur over uni-directional communication links, where the communication links between the UE and the access node are referred to as uplinks 130, and the communication links between the access node and UE is referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

For the purpose of sidelink communications, where communications occur between UEs without the involvement of an access node (except with the potential allocation of the resources by the access node), the notion of resource pools (RPs) was introduced for the LTE sidelink, and is being reused for NR sidelink. A resource pool is a set of resources that can be used for sidelink communication. Resources in a resource pool are configured for different channels including control channels (e.g., physical sidelink control channel (PSCCH)), shared channels (e.g., physical sidelink shared channel (PSSCH)), feedback channels, synchronization signals, reference signals, broadcast channels (e.g., master information block (MIB)), and so on. The technical standard defines rules on how the resources are shared and used for a particular configuration of the resource pool. However, the rules usually allow for a possibility of conflicts between multiple communications by a UE. For example, if a UE needs to transmit and receive at the same time, there is a conflict for the UE because of the half-duplex operation constraint. Another example is when a UE needs to transmit signals beamformed to different directions through a same antenna. If the antenna employs analog beamforming, which is the common practice at high frequencies, the UE cannot always perform the communications simultaneously in multiple directions.

Figure 2:
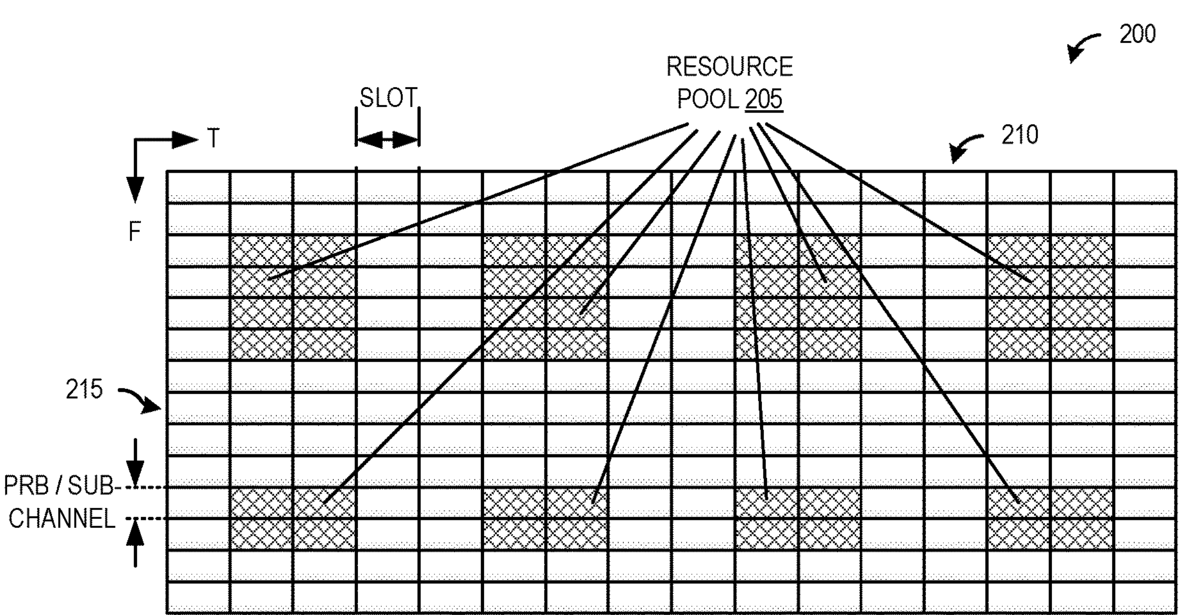
FIG. 2 illustrates a diagram of an example resource pool (RP)

According to the current agreements in 3GPP working group RAN1, a resource pool for sidelink can be configured in units of slots in the time domain and physical resource blocks (PRBs) or sub-channels in the frequency domain. A sub-channel consists of one or more PRBs. FIG. 2 illustrates a diagram 200 of an example resource pool 205. Resource pool 205 is shown in a time-frequency resource grid with time-domain slots (such as slot 210) and frequency-domain PRBs or sub-channels (such as sub-channel 215). The resource grid is configured in a band, a carrier component (CC), a bandwidth part (BWP), and so on. The number of PRBs in a resource pool can differ in each slot. In addition, the location of the resource pool can differ in each slot. The resource pool may also be absent in any particular slot.

In the rest of this disclosure, resources in the RP are illustrated with simplifications. For example, resources are shown contiguous in both time and frequency domains although they may not be contiguous in the resource grid as shown in the above example. Also, the frequency resources are not necessarily shown at the PRB/sub-channel resolution in the frequency domain.

For NR mobile broadband (MBB), each PRB in the resource grid is defined as a slot comprising 14 consecutive orthogonal frequency division multiplexed (OFDM) symbols in the time domain and 12 consecutive subcarriers in the frequency domain, i.e., each resource block contains $12\times14$ resource elements (REs). When used as a frequency-domain unit, a PRB denotes 12 consecutive subcarriers. There are 14 symbols in a slot when a normal cyclic prefix is used and 12 symbols in a slot when an extended cyclic prefix is used. The duration of a symbol is inversely proportional to the sub-carrier spacing (SCS). For a {15, 30, 60, 120} kHz SCS, the duration of a slot is {1, 0.5, 0.25, 0.125} ms, respectively. A 1 ms subframe spans {1, 2, 4, 8} or equivalently $2^\mu$ slots where $\mu=\{0, 1, 2, 3\}$ for {15, 30, 60, 120} kHz SCS, respectively. Each PRB can be allocated to combinations of control channel, shared channel, feedback channel, reference signals, and so on. In addition, some REs of a PRB can be reserved. A similar structure is likely to be used on the sidelink as well. A communication resource can be a PRB, a set of PRBs, a code (if code division multiple access (CDMA) is used, similarly as for the physical uplink control channel (PUCCH)), a physical sequence, a set of REs, and so on.

The feedback channel in the NR sidelink is used for communication of hybrid automatic repeat request (HARQ) feedback, which comprises an acknowledgment (ACK) or a negative acknowledgement (NACK) of successful receipt of a block of data in a shared channel. The amount of ACK/NACK (A/N) information is small and, therefore, the physical sidelink feedback channel (PSFCH) does not need to be configured (or transmitted) in every slot of a resource pool if the latency constraints allow it. Instead, as agreed in RAN1, a PSFCH can be configured on one every N slots in the resource pool (possibly more symbols in future releases), where N may take integer values such as 1, 2, 4, etc. Therefore, if slot $n_f$ in the resource pool contains PSFCH resources, so do slots $n_f$+N, $n_f$+2N, f+3N, . . . . The notation k mod N=$n_f$ can be used to indicate every slot k that contains a PSFCH 'instance' or a PSFCH 'opportunity.'

When a transmitting UE (source UE or TxUE) transmits signals (e.g., for a shared channel carrying data or payload) to a receiving UE (destination UE or RxUE), the destination UE attempts to demodulate and decode the signals. If the process (e.g., the decoding) is successful, the destination UE sends an ACK to the source UE; otherwise, the destination UE sends a NACK to the source UE. An example of an ACK is a logical or binary "1" while a NACK is a logical or binary "0". The reverse may also be utilized. Whether the destination UE sends an ACK/NACK depends on the standard and the HARQ process configuration. There are generally four possible cases, which are shown in Table 1

TABLE 1

Possible ACK/NACK transmission cases.

| Transmit ACK | Transmit NACK | Remarks |
|---|---|---|
| Y | Y | Called option 2 in RAN1 agreements; useful for unicast and groupcast |
| N | Y | Called option 1 in RAN1 agreements; useful for group cast |
| Y | N | Similar to IEEE 802.11 |
| N | N | e.g., when a HARQ process is not configured; useful for broadcast |

A typical operation is for the source UE to transmit a control channel and a shared channel in the same slot. The control channel includes sidelink control information (SCI) indicating the scheduling of the shared channel, where the scheduling provides information for the location (e.g., start and size) of the shared channel, the modulation-coding scheme (MCS), and so forth. The control channel may include additional information, such as fields related to the HARQ process, such as a redundancy version, a new data indicator, and a HARQ process number. If the destination UE is unable to decode the control channel for a single transmission, no feedback signal should be transmitted by the destination UE. The same concept is applicable even if the transmission of the shared channel spans multiple slots with the control channel being transmitted in the first slot. However, if a periodic or semi-persistent transmission is scheduled for a source UE, and the destination UE fails to receive a transport block (TB), the destination UE can send a NACK to the source UE.

Except for the last case shown in Table 1, the RxUE may need to transmit a feedback. Having knowledge of n_f and N as well as other configuration parameters, the RxUE can locate PSFCH resources that can be used for transmitting the feedback. However, there is another parameter that the RxUE needs to consider. When RxUE receives the signals, the RxUE needs time to process and decode the signal, create the ACK/NACK signals, and so on. The minimum time needed between receiving the last symbol of the signal and transmitting the feedback signals should be known.

It is agreed in RAN1 to have a parameter K as the minimum slot number difference between the slot containing the last symbol of a physical sidelink shared channel (PSSCH) and the slot containing its associated PSFCH. The value of K may be determined by the standard, may be (pre)configured, or may depend on a UE capability. In any case, should the RxUE that is receiving signals on a PSSCH transmit a feedback, the RxUE does so in slot n+a, where n is the slot containing the last symbol of the PSSCH and a is the smallest integer larger than or equal to K with the condition that slot n+a contains PSFCH. Therefore, $K \leq a \leq K+N-1$.

Another parameter X may be defined as the number of PSFCH symbols in a PSFCH format with a repetition of a one-symbol PSFCH. For example, when X=1, A/N feedback is not repeated; but when X=2, the RxUE retransmits the A/N feedback, which can improve reliability by increasing the effective signal-to-noise ratio (SNR) of the feedback signal received by the TxUE. For Rel-16, X=1 is supported.

Figures 3, 4:
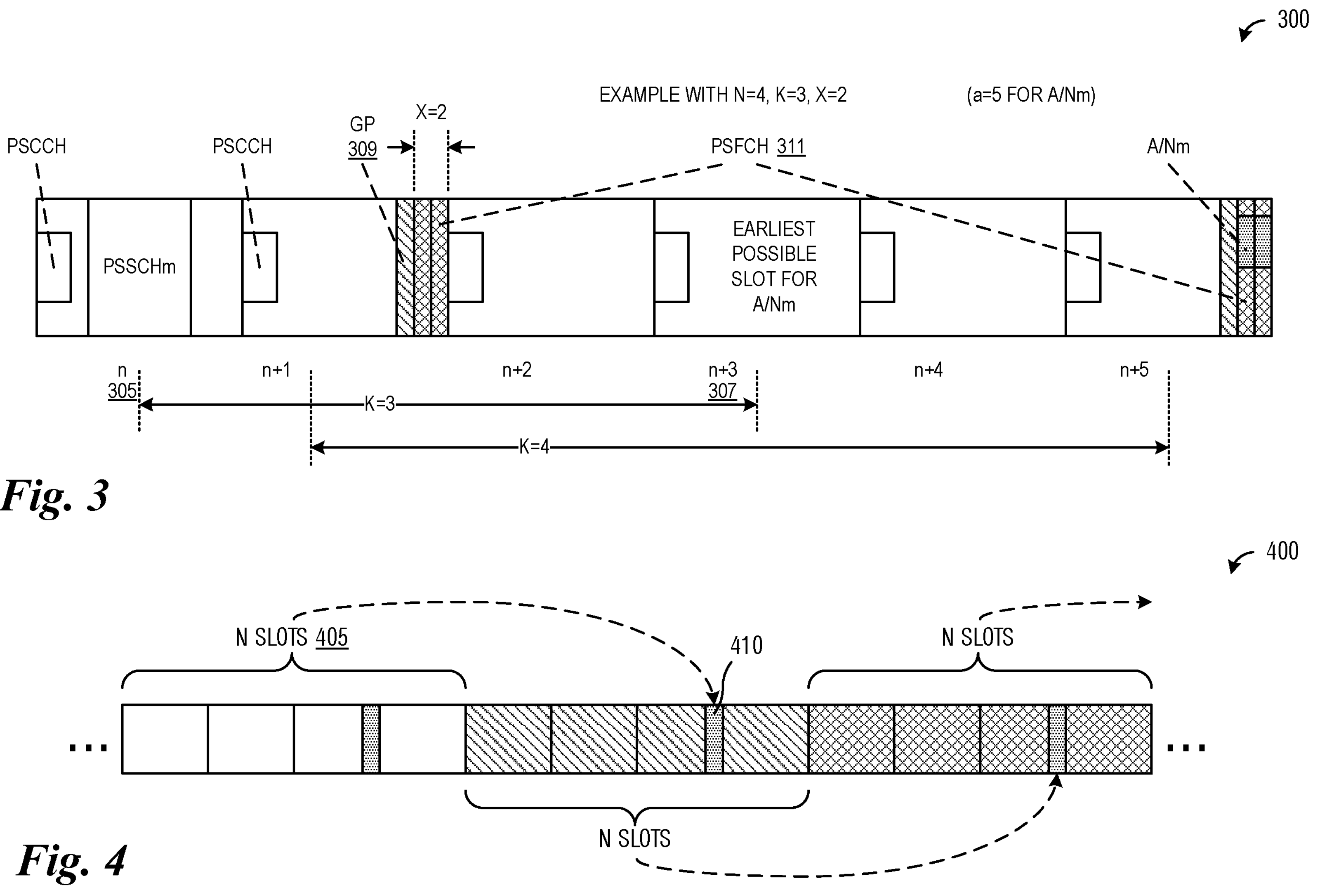
FIG. 3 illustrates a diagram of an example PSFCH configuration with parameters N, K, and X in a RP.
FIG. 4 illustrates a diagram of a resulting mapping of PSSCH resources to the corresponding PSFCH.

FIG. 3 illustrates a diagram 300 of an example PSFCH configuration with parameters N, K, and X in a RP. As shown in FIG. 3, a TxUE transmits signals on $PSSCH_m$ in slot n 305. In this example, the earliest possible slot for the corresponding $A/N_m$, i.e., n+K (slot 307), does not contain PSFCH resources. Hence, the RxUE should wait an additional number of slots in order to transmit feedback.

In the example illustrated in FIG. 3, an OFDM symbol is designated as a guard period (GP), such as GP 309, immediately preceding the PSFCH symbols 311 in order to allow UEs to switch (possibly) between transmission and reception modes. In addition, time may be needed for automatic gain control (AGC) circuitry to settle at the UE receiving the PSFCH (i.e., the TxUE). This time may be part of a GP symbol or be another symbol. Another AGC symbol, not shown in FIG. 3, may be the first symbol of a slot. AGC and GP symbols, as well as other signals such as reference signals in a slot, may be omitted in figures of this disclosure unless needed. Furthermore, X is usually assumed 1 unless stated otherwise.

FIG. 4 illustrates a diagram 400 of a resulting mapping of PSSCH resources to the corresponding PSFCH. As an example, N slots 405 are mapped to PSFCH 410.

Similar to the design of PUCCH formats, different PSFCH formats are possible and likely to be approved for different scenarios. The different formats can be categorized as short (e.g., 1-2 OFDM symbols) or long (e.g., longer than 4 OFDM symbols), which can be used for different SNR needs. Another possible format may include more PRBs. Also, in terms of the payload size, different formats can be defined that carry a small payload of 1 or 2 bits versus larger payloads, the latter case useful if ACK/NACK bundling will be adopted. Table 2 summarizes the NR Rel-15 PUCCH formats.

TABLE 2

NR Rel-15 PUCCH formats.

| | Short PUCCH | Long PUCCH |
|---|---|---|
| Small Payload | Format 0 | Format 1 |
| Moderate/Large Payload | Format 2 | Format 3/Format 4 |

Typical PSFCH formats could be based on PUCCH format 0 and format 2, both short formats, but suitable for carrying ≤2 bits and >2 bits, respectively. A PSFCH format based on PUCCH format 0 can be designed based on sequence selection, which can be utilized for application of some example embodiments in this disclosure.

As presented in 3GPP TR 38.885, which is hereby incorporated herein by reference in its entirety, there are two options for HARQ feedback when groupcast is used. For sidelink unicast and groupcast, HARQ feedback and HARQ combining in the physical layer are supported. HARQ-ACK feedback for a PSSCH is carried in sidelink feedback control information (SFCI) format(s) via PSFCH in resource allocation Modes 1 and 2.

When sidelink HARQ feedback is enabled for unicast, in the case of non-code block group (non-CBG) operation the RxUE generates HARQ-ACK if it successfully decodes the corresponding TB. The RxUE generates HARQ-NACK if it does not successfully decode the corresponding TB after decoding the associated PSCCH targeted to the RxUE.

When sidelink HARQ feedback is enabled for groupcast, it is supported to use TxUE-RxUE (TX-RX) distance and/or reference signal received power (RSRP) in deciding whether to send HARQ feedback. In the case of non-CBG operation, two options are supported:

Option 1: RxUE transmits HARQ-NACK on PSFCH if it fails to decode the corresponding TB after decoding the associated PSCCH. RxUE transmits no signal on PSFCH otherwise. Option 1 may also be referred to as HARQ feedback operation with negative acknowledgement only.

Option 2: RxUE transmits HARQ-ACK on PSFCH if it successfully decodes the corresponding TB. RxUE transmits HARQ-NACK on PSFCH if it does not successfully decode the corresponding TB after decoding the associated PSCCH which targets the RxUE.

Regarding the use of TX-RX geographical distance or RSRP in determining whether to send HARQ feedback for groupcasts, it has been agreed upon to support at least the use of TX-RX geographical distance. The support of layer 1 (L1) RSRP is an item for further study. Therefore, for at least option 1 based TX-RX distance-based HARQ feedback for groupcasts, a RxUE transmits HARQ feedback for the PSSCH if the TX-RX distance is smaller or equal to the communication range requirement. Otherwise, the RxUE does not transmit HARQ feedback for the PSSCH. TxUE's location is indicated by SCI associated with the PSSCH, and the TX-RX distance is estimated by RxUE based on its own location and TxUE's location. The communication range requirement used for a particular PSSCH is known after decoding the SCI associated with the PSSCH.

Figure 5A:
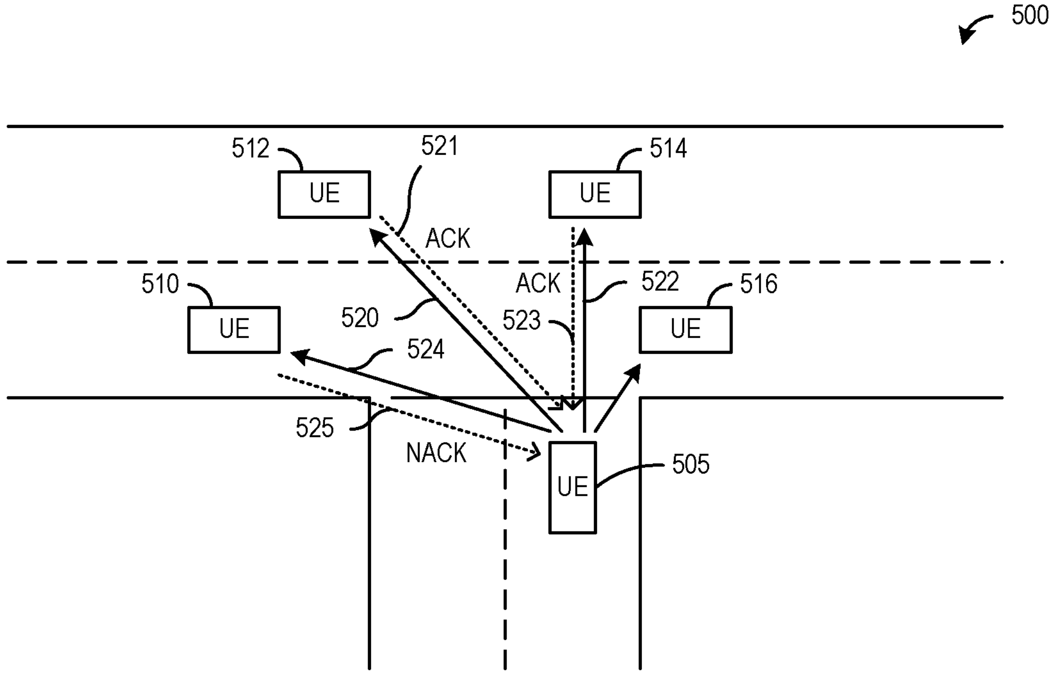
FIG. 5A illustrates a diagram of an example groupcast operation.

FIG. 5A illustrates a diagram 500 of an example groupcast operation. As shown in FIG. 5A, a UE 505 is stopped at a first street with a plurality of UEs (including UEs 510, 512, 514, and 516) moving on a cross street. UE 505 is operating as a TxUE and makes transmissions to the UEs of the plurality of UEs. As an example, UE 505 makes a transmission 520 to UE 512 and a transmission 522 to UE 514. UE 512 receives transmission 520 and sends an ACK 521 to acknowledge successful reception of transmission 520. Similarly, UE 512 receives transmission 522 and sends an ACK 523 to acknowledge successful reception of transmission 522. As another example, UE 510 is unable to correctly receive transmission 524 and sends a NACK 525 to indicate unsuccessful reception of transmission 524.

Figure 5B:
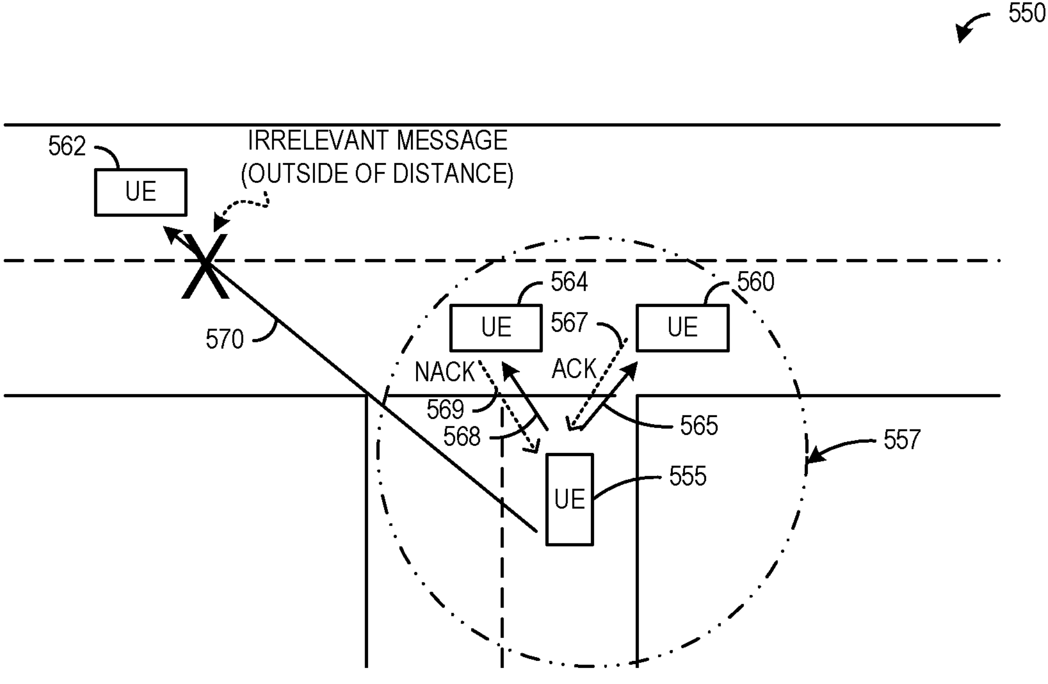
FIG. 5B illustrates a diagram of an example usage of distance-based groupcast option 1 operation.

FIG. 5B illustrates a diagram 550 of an example usage of distance-based groupcast option 1 operation. As shown in FIG. 5B, a UE 555 is stopped at a first street with a plurality of UEs (including UEs 560 and 562) moving on a cross street. UE 555 is operating as a TxUE. A dashed circle 557 represents a communication range requirement, where if a RxUE receives a transmission from the TxUE AND the RxUE is within the communication range, the RxUE sends HARQ feedback (based on its ability to decode the transmission). UE 555 makes a transmission 565 to UE 560, and UE 560 successfully receives transmission 565, hence, UE 560 transmits an ACK 567 to UE 555. UE 555 also makes a transmission 568 to UE 564, but UE 564 is unable to successfully receive transmission 568. Hence, UE 564 sends a NACK 569 to indicate unsuccessful reception of transmission 568. UE 555 further makes a transmission 570 to UE 562. However, UE 562 is outside of the communication range. Therefore, transmission 570 is an irrelevant message and UE 562 does not send HARQ feedback, independent of whether or not transmission 570 was successfully received.

Figure 6:
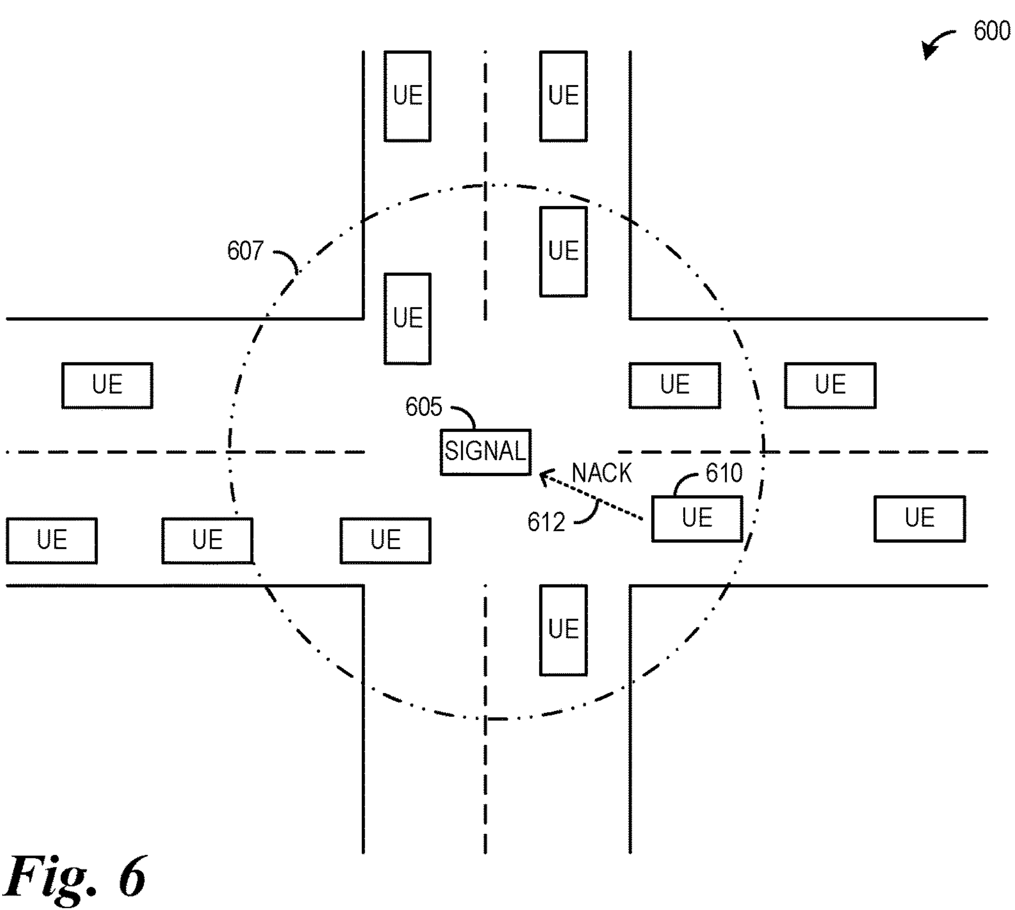
FIG. 6 illustrates a diagram of an example deployment of distance-based groupcast option 1 operation.

FIG. 6 illustrates a diagram 600 of an example deployment of distance-based groupcast option 1 operation. An example deployment of distance-based groupcast option 1 operation is a traffic-based deployment with the TxUE 605 being a street signal. TxUE 605 may groupcast its status, such as red light, green light, or yellow light, to RxUEs located within communication range 607. RxUEs within communication range 607 send HARQ feedback in accordance with the decoding of transmissions made by TxUE 605. However, UEs that are not in communication range 607 do not send HARQ feedback regardless of their ability to successfully receive transmissions made by TxUE 605.

When distance-based groupcast option 1 is used by a UE group, the RxUE (that is part of the UE group) sends a NACK if it has not correctly received the packet AND if it is within a specified distance from the TxUE. However, if the RxUE does not know its location (e.g., due to loss of the Global Navigation Satellite System (GNSS) signal, for example), the RxUE has no idea if it needs to send HARQ feedback. If the RxUE sends nothing in this situation, is interpreted as either the RxUE is too far away (the RxUE is not within the communication range requirement of the TxUE) OR that the RxUE is within a given distance and the packet was received correctly, neither of which is correct. Sending a NACK in this situation is also not correct, because the ReUE may actually not be within the communication range requirement and actions subsequently taken by the TxUE (such as re-transmitting a packet to the group) may be unnecessary and wasteful. Therefore, there is a need for the RxUE to notify the TxUE that distance-based groupcast option 1 needs to be disabled.

According to an example embodiment, methods and apparatus are provided for disabling of option 1 HARQ feedback. There may be several situations when it becomes necessary to disable option 1 HARQ feedback. They include: 1) the RxUE temporarily loses its location information, and 2) the RxUE is not able to access its location. In either situation, it is necessary to disable option 1 HARQ feedback because incorrect operation can lead to incorrect results (when the RxUE sends no HARQ feedback) or unnecessary re-transmissions (when the RxUE sends a NACK).

According to an example embodiment, in the situation when the RxUE loses its location information, the RxUE disables distance-based groupcast option 1 operation. In this situation, the RxUE may have been operating in distance-based groupcast option 1 mode, but at a given point in time, the RxUE loses its distance-based information (the RxUE may lose the GNSS signal, for example) and disables the distance-based groupcast option 1 operation. In an embodiment, the RxUE disables the distance-based groupcast option 1 operation for itself. In an embodiment, the RxUE disables the distance-based groupcast option 1 operation by sending an indication disabling the distance-based groupcast option 1 operation.

Figure 7A:
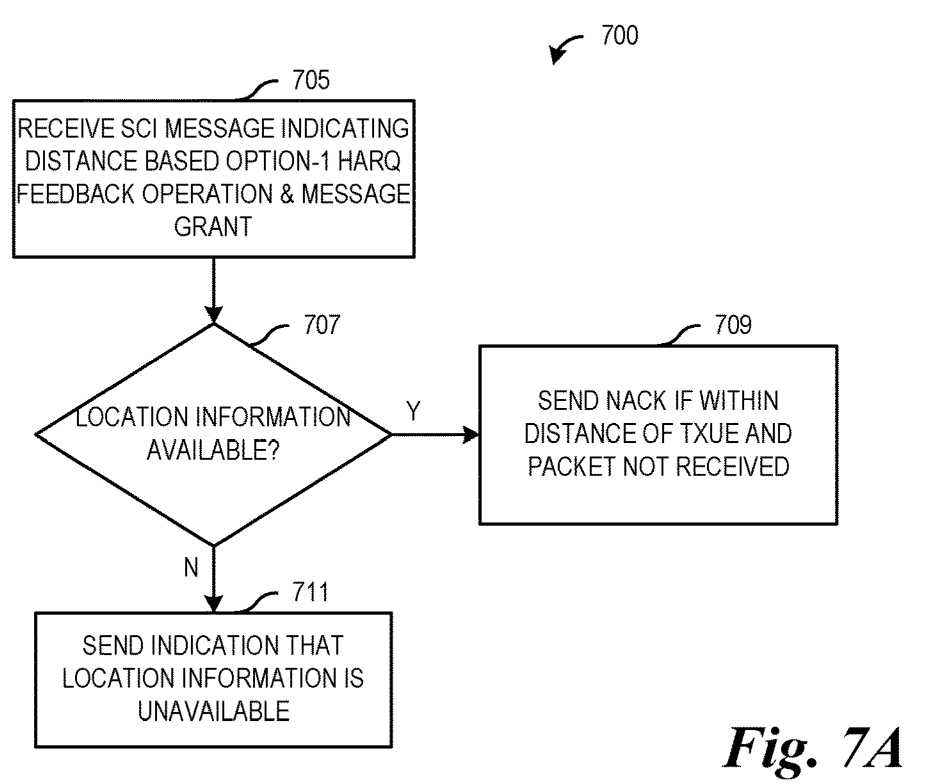
FIG. 7A illustrates a flow diagram of example operations occurring in a RxUE operating in distance-based groupcast option 1 mode according to example embodiments presented herein.

FIG. 7A illustrates a flow diagram of example operations 700 occurring in a RxUE operating in distance-based groupcast option 1 mode. Operations 700 may be indicative of operations occurring in a RxUE as the RxUE operates in distance-based groupcast option 1 mode.

Operations 700 begin with the RxUE receiving a SCI message indicating that the RxUE has a downlink grant to receive a packet (block 705). The SCI message also indicates that distance-based groupcast option 1 mode is used. As an example, the SCI message includes a flag or 1-bit indicator indicating that HARQ is used, a field indicating that a second stage SCI is for distance-based groupcast option 1 mode, and the second stage SCI indicating the communication range for reporting HARQ feedback.

The RxUE performs a check to determine if location information is available (block 707). The RxUE may check to determine if it has current location information, where current location information is location information that may be less than a specified age, for example.

If the RxUE does have location information, the RxUE evaluates the distance between itself and the TxUE, and if the distance is greater than the communication range (indicated in the SCI message, for example), the RxUE reports nothing. The communication range is an example of a distance threshold. In general, a distance threshold may be a distance measurement (based on GNSS information, for example). But other forms of distance thresholds may also be used. As an example, signal strength or signal quality information may be used to infer or estimate the distance. In such a situation, if the signal strength or signal quality is determined to be below a signal threshold, the distance between the RxUE and the TxUE may be considered to be greater than the communication range.

However, if the distance is less than (or less than or equal to) the communication range AND if the RxUE has not successfully received the packet associated with the downlink grant, the RxUE sends a NACK (block 709). In an embodiment, if the distance is less than (or less than or equal to) the communication range AND if the RxUE has successfully received the packet associated with the downlink grant, the RxUE sends nothing. In an embodiment, if the distance is less than (or less than or equal to) the communication range AND if the RxUE has successfully received the packet associated with the downlink grant, the RxUE sends an ACK.

If the RxUE does not have location information, the RxUE sends an indication that location information is unavailable (block 711). If the RxUE does not have location information, the RxUE does not know if it is within the communication range. Hence, the RxUE does not know if has to report HARQ feedback.

There may be several ways to send the indication that location information is unavailable, they include:

- Radio resource control (RRC) signaling: The RxUE sends a RRC signaling message on the PC5 interface. The message may indicate that the RxUE does not have location information. Alternatively, the RxUE may send a message to be suspended from the group (the group participating in the groupcast) for a specified time period or until a further message is received. Alternatively, the RxUE may send a message to leave the group.
- Physical (PHY) layer message: The RxUE may send an SCI with a specific format to indicate that the RxUE does not have location information. A detailed description of the PHY layer message is provided below.
- PSFCH message: The RxUE may send a signal on the PSFCH to indicate that the RxUE does not have location information. This signal could not be sent on the same resource(s) as the NACK. The resource(s) where to send the PSFCH may be derived from the resources where to the send the ACK (e.g., a fixed offset from the resources where to send the ACK).

In the situation where the PHY layer message is used, a new SCI format may be used.

- As an example, a first stage SCI (SCI 0_0) may need to indicate no resources in the resource allocation field, and no reservation.
- As another example, a first stage SCI may indicate a new format for a second stage SCI. Alternatively, the first stage SCI may indicate an existing SCI format, but with a different field mapping.
  - The SCI may indicate if ACK/NACK is to be used (e.g., a 1-bit flag), and if option 1 or option 2 is used (e.g., a 1-bit flag). The RxUE may set the option 1/option 2 flag to indicate option 2 so that the TxUE knows to stop using option 1.
  - The location field may be set to a specified value to indicate that the RxUE does not have location information (e.g., (0,0)), same as a TxUE, etc.

In case of unicast, or generally speaking, when the transmission is symmetric, with each UE transmitting a similar amount of data with similar periodicity, then after receiving a message, the RxUE will become the TxUE. In such a case, the RxUE (now the TxUE) will send an SCI to the TxUE (now the RxUE). The RxUE can then indicate in the SCI that option 1 is not to be used because of location information being unavailable.

In an embodiment, when the RxUE is checking to determine if location information is available, the RxUE considers information in addition to a single SCI message. As an example, the RxUE considers location information to be unavailable if it is unavailable for a specified number of consecutive slots (e.g., 5 or 10 consecutive slots, but other values are possible), a specified number of slots out of a number of slots (e.g., 5 slots out of the last 10 slots, but other values are possible). In this embodiment, timers or counters may be used to determine if location information is available. While the location information is still considered to be available (although not at the time of reception of the latest SCI), the most recent location information is used for block 709, for example. Alternatively, the RxUE is considered to be in range. Alternatively, the RxUE is considered to be out of range.

Location information may be unavailable before the communication of a PC5 RRC or a capability exchange, if some UEs are not able to provide location information at all (see the discussion presented below). If, by default, UEs are assumed to be capable of providing location information and incapability needs to be signaled, the TxUE may indicate option 1 HARQ to RxUEs in the group including the RxUE before the RxUE indicates its incapability. In an alternate embodiment, until the PC5 RRC exchange or similar method of capability exchange occurs, the RxUE may behave as if location information is available, and either consider itself to be in range (the RxUE sending NACK if the packet is not received correctly and nothing if received correctly) or out of range (the RxUE sends nothing).

In an alternate embodiment, the RxUE behavior when the RxUE does not have location information available is undefined. The RxUE may decide to behave as if it is in range, or out of range. The RxUE may send nothing in response to the packet transmission, or the RxUE may send NACK if the packet is not successfully received. In an alternate embodiment, the undefined UE behavior is used prior to a PC5 RRC capability exchange. In an alternate embodiment, the RxUE determines if it is in range by substituting its unknown location with the location of another UE or the access node, if it was last in coverage of or in close range to that UE or access node.

Although the discussion presented herein focuses on location and location information, the example embodiments are also operable with range. As an example, if a RxUE knows that it is within a given range of the TxUE (either through location information or derivation from other information, such as RSRP or received signal strength indicator (RSSI) measurements, or if the RxUE does not know if it is within range, the RxUE may behave as discussed above for situations when the RxUE knows its location or if the location information is unavailable. Therefore, the discussion of location and location information should not be construed as being limiting to the scope of the example embodiments.

According to an example embodiment, in the situation when the RxUE does not have access to its location, the RxUE indicates that if it is able to obtain its location or if it is able to perform distance-based HARQ feedback. In such a situation, the RxUE is not able perform distance-based groupcast operation at all until it is able to obtain its location. Hence, if the RxUE is unable to obtain its location, the RxUE cannot perform distance-based groupcast operation. In an embodiment, the RxUE indicates if it is able to obtain its location. In an embodiment, the RxUE indicates if it can perform distance-based HARQ feedback operation. In an embodiment, the RxUE sends an RRC signaling message. The message may indicate that the RxUE does not have location information. Alternatively, the RxUE may send a message to be suspended from the group (the group participating in the groupcast) for a specified time period or until a further message is received. Alternatively, the RxUE may send a message to leave the group. The RRC signaling message may be sent using PC5 RRC signaling when the group including the RxUE is established.

Figure 7B:
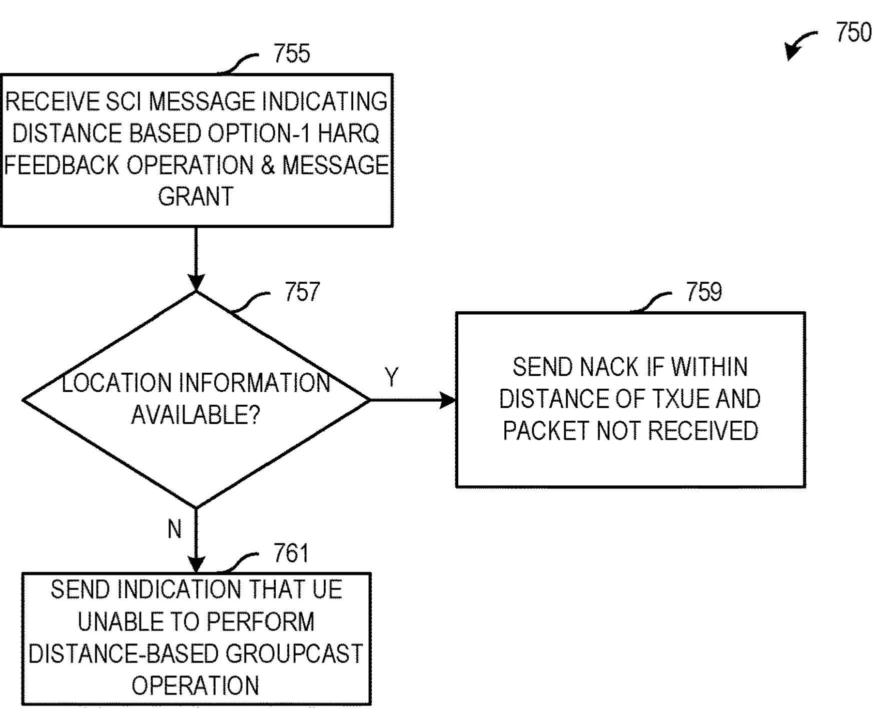
FIG. 7B illustrates a flow diagram of example operations occurring in a RxUE operating in distance-based groupcast option 1 mode according to example embodiments presented herein.

FIG. 7B illustrates a flow diagram of example operations 750 occurring in a RxUE operating in distance-based groupcast option 1 mode. Operations 750 may be indicative of operations occurring in a RxUE as the RxUE operates in distance-based groupcast option 1 mode.

Operations 750 begin with the RxUE receiving a SCI message indicating that the RxUE has a downlink grant to receive a packet (block 755). The SCI message also indicates that distance-based groupcast option 1 mode is used. As an example, the SCI message includes a flag or 1-bit indicator indicating that HARQ is used, a field indicating that a second stage SCI is for distance-based groupcast option 1 mode, and the second stage SCI indicating the communication range for reporting HARQ feedback.

The RxUE performs a check to determine if location information is available (block 757). The RxUE may check to determine if it has access to the location information, for example.

If the RxUE does have location information, the RxUE evaluates the distance between itself and the TxUE, and if the distance is greater than the communication range (indicated in the SCI message, for example), the RxUE reports nothing. However, if the distance is less than (or less than or equal to) the communication range AND if the RxUE has not successfully received the packet associated with the downlink grant, the RxUE sends a NACK (block 759). In an embodiment, if the distance is less than (or less than or equal to) the communication range AND if the RxUE has successfully received the packet associated with the downlink grant, the RxUE sends nothing. In an embodiment, if the distance is less than (or less than or equal to) the communication range AND if the RxUE has successfully received the packet associated with the downlink grant, the RxUE sends an ACK.

If the RxUE does not have the location information, the RxUE sends an indication that it is unable to perform distance-based groupcast operation (block 761). If the RxUE does not have access to the location information, the RxUE is not able to participate to distance-based groupcast operation, so the RxUE informs the TxUE that the RxUE is unable to participate in distance-based groupcast operation. The RxUE sends an RRC signaling message. The message may indicate that the RxUE does not have location information. Alternatively, the RxUE may send a message to be suspended from the group (the group participating in the groupcast) for a specified time period or until a further message is received. Alternatively, the RxUE may send a message to leave the group. The RRC signaling message may be sent using PC5 RRC signaling when the group including the RxUE is established.

Although the discussion presented herein does not focus on packet priority, the example embodiments are operable when packet priority is considered. As an example, the rules applied to HARQ feedback may depend upon the priority level. For instance, for a high priority packet, if the RxUE does not have location information and if the packet was not successfully received, the RxUE may still send a NACK (given that the packet is a high priority packet). Similarly, for a low priority packet when the RxUE does not have location information, the RxUE may behave as described previously.

In an embodiment, the RxUE always transmits a NACK if location information is unavailable even if the packet is successfully received. In this situation, the RxUE may be implicitly indicating to the TxUE that the RxUE does not want to operate in distance-based groupcast option 1 mode.

Figure 8:
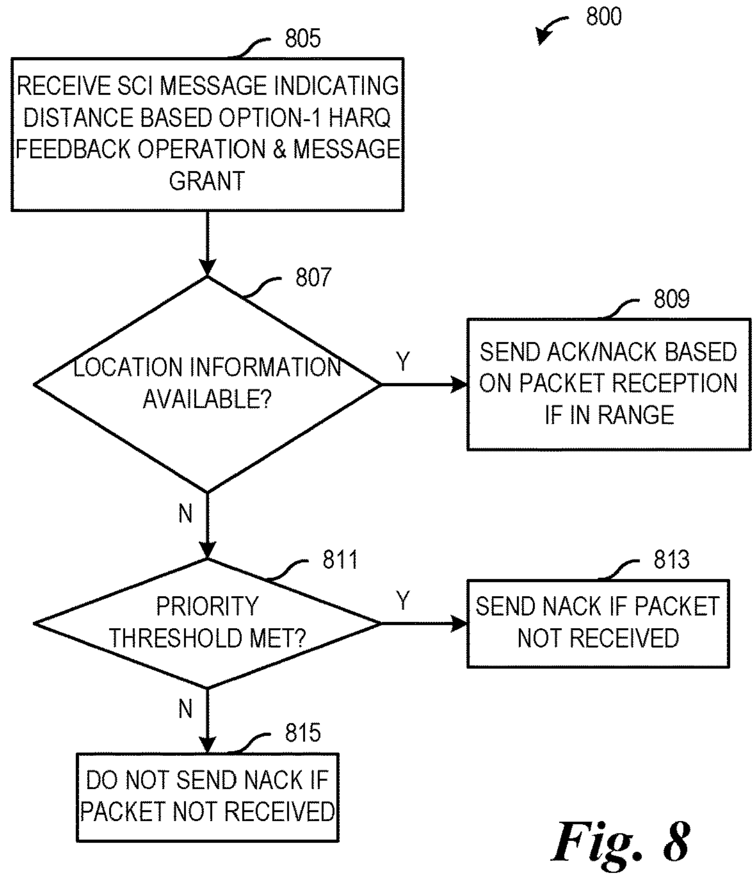
FIG. 8 illustrates a flow diagram of example operations occurring in a RxUE operating in distance-based groupcast option 1 mode highlighting packet priority based operation according to example embodiments presented herein.

FIG. 8 illustrates a flow diagram of example operations 800 occurring in a RxUE operating in distance-based groupcast option 1 mode highlighting packet priority based operation. Operations 800 may be indicative of operations occurring in a RxUE as the RxUE operates in distance-based groupcast option 1 mode, and highlights packet priority based operation.

Operations 800 begin with the RxUE receiving a SCI message indicating that the RxUE has a downlink grant to receive a packet (block 805). The SCI message also indicates that distance-based groupcast option 1 mode is used. As an example, the SCI message includes a flag or 1-bit indicator indicating that HARQ is used, a field indicating that a second stage SCI is for distance-based groupcast option 1 mode, and the second stage SCI indicating the communication range for reporting HARQ feedback.

The RxUE performs a check to determine if location information is available (block 807). The RxUE may check to determine if it has current location information, where current location information is location information that may be less than a specified age, for example.

If the RxUE does have location information, the RxUE evaluates the distance between itself and the TxUE, and if the distance is less than (or less than or equal to) the communication range (as indicated in the SCI message), the RxUE reports HARQ feedback based on the success or failure of receiving the packet associated with the sidelink grant (block 809).

If the RxUE does not have location information, the RxUE performs a check to determine if the priority of the packet associated with the sidelink grant meets a priority threshold (block 811). The priority threshold may be specified in a technical standard, or by an operator of the communication system. Alternatively, the RxUEs and the TxUEs may collaborate to determine the priority threshold.

If the priority threshold is met, the RxUE sends a NACK if the packet is not received (block 813). If the priority threshold is not met, the RxUE does not send a NACK if the packet is not received (block 815). The difference in behavior (sending a NACK or not sending a NACK) based on priority may be helpful in ensuring the delivery of high priority packets at the expense of potentially unnecessary re-transmissions.

Figure 9:
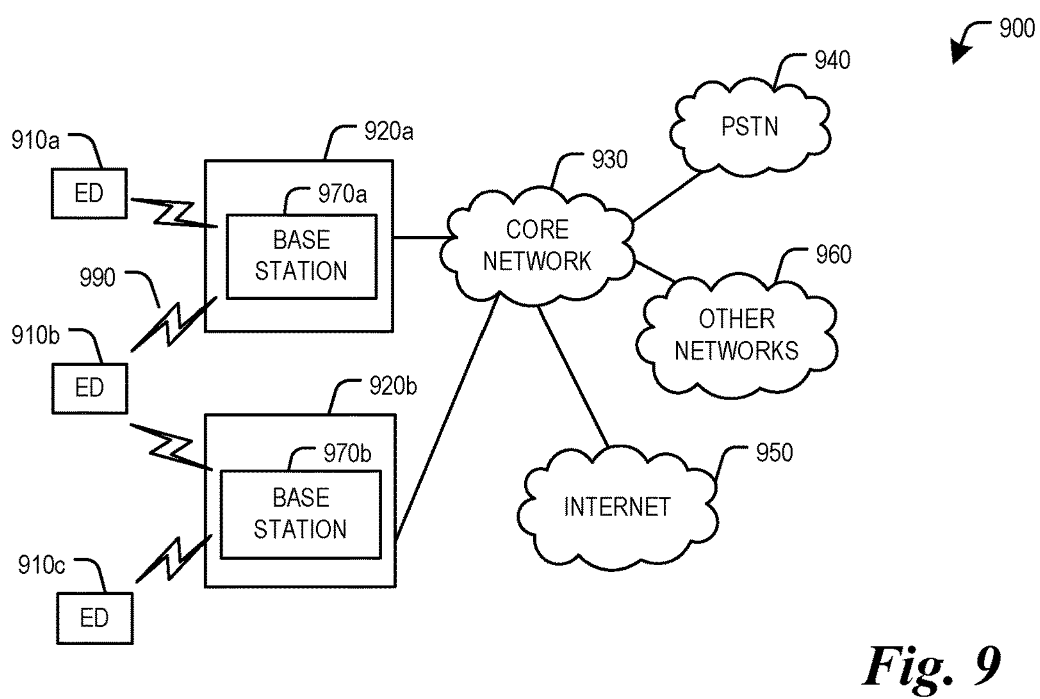
FIG. 9 illustrates an example communication system according to example embodiments presented herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910*a*-910*c*, radio access networks (RANs) 920*a*-920*b*, a core network 930, a public switched telephone network (PSTN) 940, the Internet 950, and other networks 960. While certain numbers of these components or elements are shown in FIG. 9, any number of these components or elements may be included in the system 900.

The EDs 910*a*-910*c* are configured to operate or communicate in the system 900. For example, the EDs 910*a*-910*c* are configured to transmit or receive via wireless or wired communication channels. Each ED 910*a*-910*c* represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 920*a*-920*b* here include base stations 970*a*-970*b*, respectively. Each base station 970*a*-970*b* is configured to wirelessly interface with one or more of the EDs 910*a*-910*c* to enable access to the core network 930, the PSTN 940, the Internet 950, or the other networks 960. For example, the base stations 970*a*-970*b* may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 910*a*-910*c* are configured to interface and communicate with the Internet 950 and may access the core network 930, the PSTN 940, or the other networks 960.

In the embodiment shown in FIG. 9, the base station 970*a* forms part of the RAN 920*a*, which may include other base stations, elements, or devices. Also, the base station 970*b* forms part of the RAN 920*b*, which may include other base stations, elements, or devices. Each base station 970*a*-970*b* operates to transmit or receive wireless signals within a particular geographic region or area, sometimes referred to as a “cell.” In some embodiments, multiple-input multiple-output (MIMO) technology may be employed having multiple transceivers for each cell.

The base stations 970*a*-970*b* communicate with one or more of the EDs 910*a*-910*c* over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 920*a*-920*b* are in communication with the core network 930 to provide the EDs 910*a*-910*c* with voice, data, application, Voice over Internet Protocol (VoIP), or other services. Understandably, the RANs 920*a*-920*b* or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910*a*-910*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
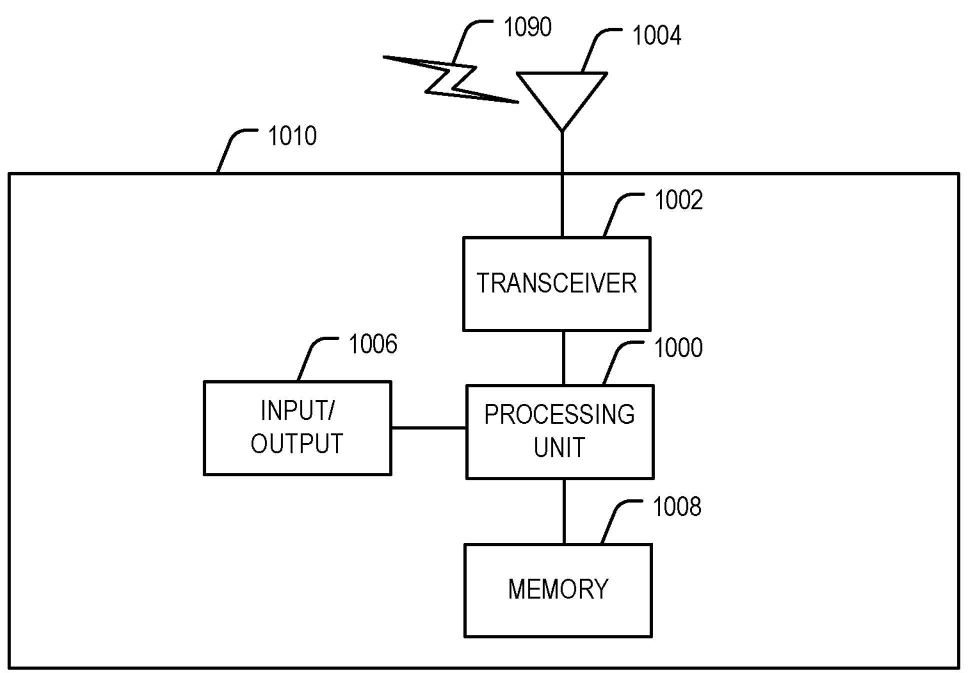
FIGS. 10A and 10B illustrate example devices that may implement the methods and teachings according to this disclosure.
Figure 10B:
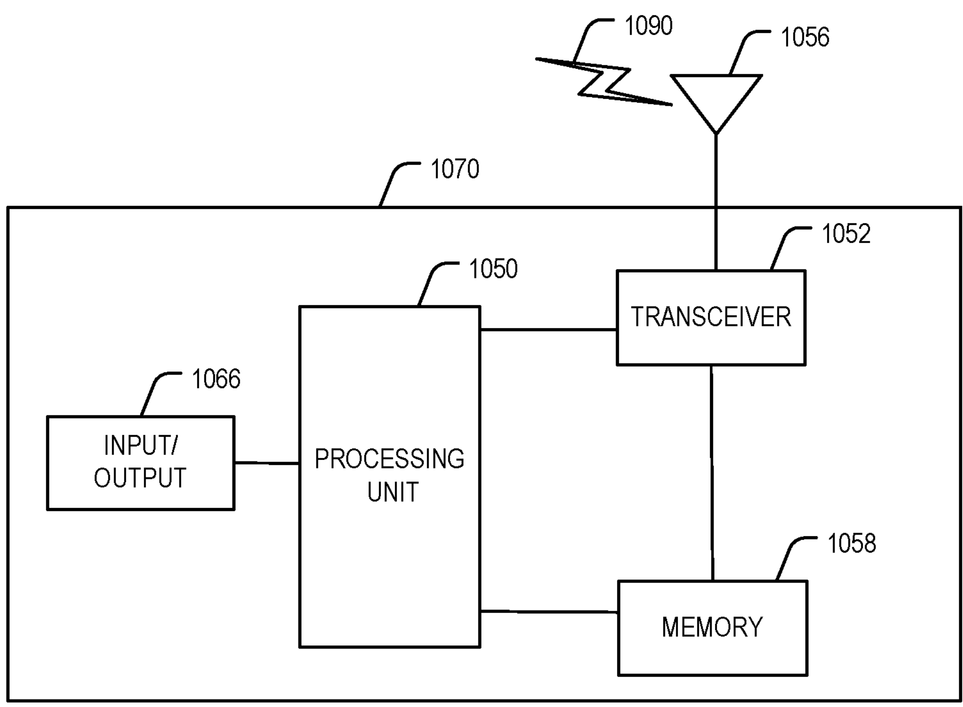

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission or processing signals received wirelessly or by wire. Each antenna 1004 includes any suitable structure for transmitting or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) 1000 and data used to reduce or eliminate interference in incoming signals. Each memory 1008 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
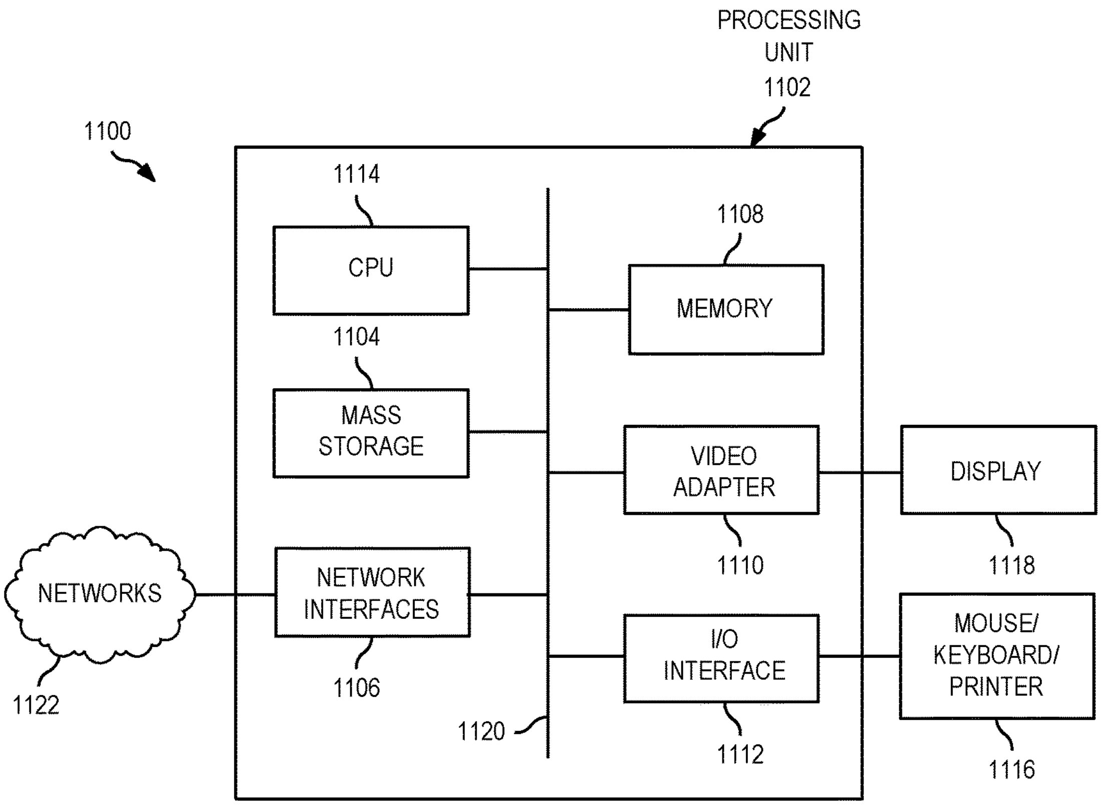
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and a mouse, keyboard, or printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, or an evaluating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:

receiving, by a first communication device, a first indicator indicating distance-based hybrid automatic repeat request (HARQ) feedback operation with negative acknowledgement only and a first sidelink message grant;

decoding, by the first communication device, a received first packet associated with the first sidelink message grant;

in accordance with an unsuccessful decoding of the received first packet, transmitting, by the first communication device, a negative acknowledgement (NACK) based on the first indicator and based on that location information associated with the first communication device is available and a distance based on the location information and that a second location of a second communication device is less than a communication range, wherein the first sidelink message grant comprises the second location of the second communication device and the communication range, wherein the first indicator, the first sidelink message grant, and the communication range are received in a same SCI message;

receiving, by the first communication device from a third communication device, a third indicator indicating a second sidelink message grant;

determining, by the first communication device, that the location information is available; and based on the determining that the location information is available:

evaluating, by the first communication device, a second distance between the first communication device and the third communication device;

determining, by the first communication device, that a sidelink message associated with the second sidelink message grant was unsuccessfully received and the second distance meets a distance threshold; and based on the determining that the sidelink message was unsuccessfully received and the second distance meets the distance threshold:

transmitting, by the first communication device to the third communication device, a second NACK.

2. The method of claim 1, the first communication device comprising a sidelink user equipment (UE).

3. The method of claim 1, the NACK being transmitted in a physical sidelink feedback channel (PSFCH).

4. The method of claim 1, the first indicator being received from the second communication device.

5. The method of claim 1, the location information comprising a first location of the first communication device.

6. The method of claim 1, the NACK being transmitted to the second communication device.

7. A method comprising:

receiving, by a first communication device, a first indicator indicating distance-based hybrid automatic repeat request (HARQ) feedback operation with negative acknowledgement only and a first sidelink message grant;

determining, by the first communication device, that location information is unavailable and a first sidelink message associated with the first sidelink message grant was unsuccessfully received;

based on the determining that the location information is unavailable and the first sidelink message was unsuccessfully received:

determining, by the first communication device, a priority of the first sidelink message associated with the first sidelink message grant meets a priority threshold; and based on the determining that the priority meets the priority threshold:

transmitting a negative acknowledgement (NACK);

receiving, by the first communication device, a second indicator indicating a second sidelink message grant;

determining, by the first communication device, that the location information is unavailable and a second sidelink message associated with the second sidelink message grant was unsuccessfully received; and based on the determining that the location information is unavailable and the second sidelink message was unsuccessfully received:

determining, by the first communication device, a second priority of the second sidelink message associated with the second sidelink message grant fails to meet the priority threshold; and based on the determining that the second priority fails to meet the priority threshold:

stopping, by the first communication device, a transmission of the NACK.

8. The method of claim 7, the first indicator being received in a sidelink control information (SCI) message.

9. The method of claim 7, the first indicator being received from a second communication device.

10. A first communication device comprising:

one or more processors; and a non-transitory memory storage comprising instructions that, when executed by the one or more processors, cause the first communication device to:

receive a first indicator indicating distance-based hybrid automatic repeat request (HARQ) feedback operation with negative acknowledgement only and a first sidelink message grant;

decode a received first packet associated with the first sidelink message grant;

in accordance with an unsuccessful decoding of the received first packet, transmit a negative acknowledgement (NACK) based on the first indicator and based on that location information associated with the first communication device is available and a distance based on the location information and that a second location of a second communication device is less than a communication range, wherein the first sidelink message grant comprises the second location of the second communication device and the communication range, wherein the first indicator, the first sidelink message grant, and the communication range are received in a same SCI message;

receive, from a third communication device, a third indicator indicating a second sidelink message grant;

determine that the location information is available; and based on determination that the location information is available:

evaluate a second distance between the first communication device and the third communication device; and determine that a sidelink message associated with the second sidelink message grant was unsuccessfully received and the second distance meets a distance threshold; and based on determination that the sidelink message was unsuccessfully received and the second distance meets the distance threshold:

transmit, to the third communication device, a second NACK.

11. The first communication device of claim 10, the first communication device comprising a sidelink user equipment (UE).

12. The first communication device of claim 10, the NACK being transmitted in a physical sidelink feedback channel (PSFCH).

13. The first communication device of claim 10, the first indicator being received from the second communication device.

14. The first communication device of claim 10, the location information comprising a first location of the first communication device.

15. The first communication device of claim 10, the NACK being transmitted to the second communication device.

16. A first communication device comprising:

one or more processors; and a non-transitory memory storage comprising instructions that, when executed by the one or more processors, cause the first communication device to:

receive a first indicator indicating distance-based hybrid automatic repeat request (HARQ) feedback operation with negative acknowledgement only and a first sidelink message grant;

determine that location information is unavailable and a first sidelink message associated with the first sidelink message grant was unsuccessfully received;

based on determination that the location information is unavailable:

determine a priority of the first sidelink message associated with the first sidelink message grant meets a priority threshold; and based on determination that the priority meets the priority threshold:

transmitting a negative acknowledgement (NACK);

receive a second indicator indicating a second sidelink message grant;

determine that the location information is unavailable and a second sidelink message associated with the second sidelink message grant was unsuccessfully received; and based on determination that the location information is unavailable and the second sidelink message was unsuccessfully received:

determine a second priority of the second sidelink message associated with the second sidelink message grant fails to meet the priority threshold; and based on determination the second priority fails to meet the priority threshold:

stop a transmission of the NACK.

17. The first communication device of claim 16, the first indicator being received in a sidelink control information (SCI) message.

18. The first communication device of claim 16, the first indicator being received from a second communication device.

* * * * *